US008983913B2

(12) United States Patent
Held

(10) Patent No.: US 8,983,913 B2
(45) Date of Patent: Mar. 17, 2015

(54) SYSTEM AND METHOD FOR BUSINESS-DRIVEN ARCHIVING

(75) Inventor: Dominik Held, Waghaeusel (DE)

(73) Assignee: SAP SE, Walldorf (DE)

( * ) Notice: Subject to any disclaimer, the term of this patent is extended or adjusted under 35 U.S.C. 154(b) by 291 days.

(21) Appl. No.: 13/537,442

(22) Filed: Jun. 29, 2012

(65) Prior Publication Data
US 2014/0006356 A1   Jan. 2, 2014

(51) Int. Cl.
G06F 17/30 (2006.01)

(52) U.S. Cl.
CPC .................. G06F 17/30595 (2013.01)
USPC ......................................... 707/667

(58) Field of Classification Search
CPC ............................... G06F 17/30073
USPC ......................................... 707/667
See application file for complete search history.

(56) References Cited

U.S. PATENT DOCUMENTS

| | | | | |
|---|---|---|---|---|
| 7,769,615 | B2* | 8/2010 | Linder et al. | 705/7.29 |
| 8,458,201 | B2* | 6/2013 | Pollinger | 707/756 |
| 2005/0149584 | A1* | 7/2005 | Bourbonnais et al. | 707/204 |
| 2005/0149907 | A1* | 7/2005 | Seitz et al. | 717/108 |
| 2006/0218127 | A1* | 9/2006 | Tate et al. | 707/3 |
| 2007/0208605 | A1* | 9/2007 | Ambrose et al. | 705/9 |
| 2007/0220068 | A1* | 9/2007 | Thompson et al. | 707/203 |
| 2008/0015889 | A1* | 1/2008 | Fenster | 705/1 |
| 2009/0164497 | A1* | 6/2009 | Steinmaier et al. | 707/102 |
| 2010/0088284 | A1* | 4/2010 | Cina | 707/665 |
| 2011/0137869 | A1* | 6/2011 | Coldicott et al. | 707/661 |
| 2011/0137871 | A1* | 6/2011 | Coldicott et al. | 707/665 |
| 2011/0289046 | A1* | 11/2011 | Leach et al. | 707/602 |
| 2012/0030180 | A1* | 2/2012 | Klevenz et al. | 707/661 |
| 2012/0179779 | A1* | 7/2012 | Awasthi | 709/217 |

OTHER PUBLICATIONS

Halprin, Jack "Official Google for Work Blog: Google Apps Vault Brings Information Governance to Google Apps," Mar. 28, 2012, http://googleforwork.blogspot.com/2012/03/google-apps-vault-brings-information.html, accessed Jan. 14, 2015.*

* cited by examiner

Primary Examiner — Richard Bowen
(74) Attorney, Agent, or Firm — Schwegman Lundberg & Woessner, P.A.

(57) ABSTRACT

A computer system maintains a repository of software products. The software products include a plurality of business processes, and each business process includes a business object. The system maintains a plurality of archiving objects, and further maintains a mapping of each business process to at least one business object, a mapping of each business object to at least one related database table, and a mapping of each database table to at least one related archiving object. The system receives a selection of a business process for which data is to be archived, and uses the mapping of the each business process to the at least one business object, the mapping of the each business object to the at least one database table, and the mapping of the each database table to the at least one archiving object to determine the database tables to transmit to the archiving objects.

12 Claims, 5 Drawing Sheets

_US 8,983,913 B2_

SYSTEM AND METHOD FOR BUSINESS-DRIVEN ARCHIVING

TECHNICAL FIELD

The present disclosure relates to a system and method for business-driven archiving of database tables.

BACKGROUND

It is virtually impossible for a business user to know or determine the database tables and archiving objects that are associated or linked to any particular business process. Consequently, a systems person must perform a technical analysis of a database to determine the database tables that are voluminous, and then implement an archiving strategy based on this information. Unfortunately, this procedure and strategy usually do not identify business critical processes because of the lack of functions in business systems that can extract information showing the relationship of database tables, archiving objects, and business processes. Simply put, current archiving strategies are purely database size and/or growth driven as a result of technical monitoring of such databases.

Similarly, controlling a system landscape in terms of data volume management (DVM) measures such as avoidance, summarization, deletion, or archiving of data is one of the most complex tasks and projects in the whole lifecycle of heterogenous system landscapes. The reason for the complexity is the unique fingerprint of each and every system in a customer's environment. Every system is unique in terms of configuration and customizing, and this uniqueness results in differences of how much and to which tables data are written. As a consequence, customers are burdened with the task of identifying data objects (e.g., database tables) that should be focused on in a data volume management concept, rather than focusing on the evaluation of residence times or the selection of type of documents that should be deleted or should be archived.

For example, in an average landscape there is normally an enterprise resource planning (ERP) system, a business information warehouse (BW) system, a customer relations management (CRM) system, and an exchange infrastructure (XI)/process integration (PI). With just these four products in a landscape, the system may have up to a hundred thousand or more database tables in the landscape. Due to historical reasons, customers are starting to analyze their system landscapes from a database table level. While this may have been doable years ago, nowadays it is nearly impossible to follow this kind of approach without having some criteria on how to set the priority correspondingly.

DETAILED DESCRIPTION

Figure 1:
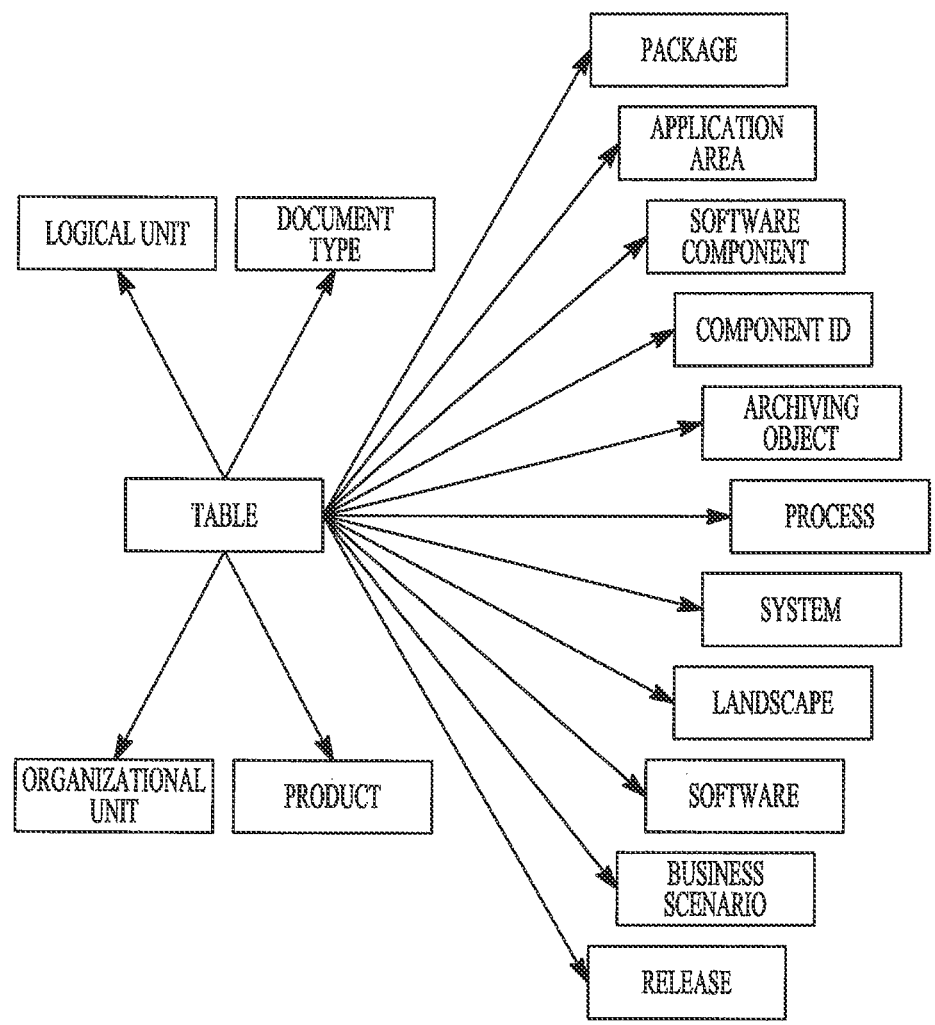
FIG. 1 illustrates numerous ways that a database table can be linked to a variety of related technical objects and business related objects.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 illustrates numerous ways that a database table can be linked to a variety of related technical objects and business related objects, including such objects as a logical unit, an application area, a software component, an archiving object, a business scenario, and an organizational unit. As a person of skill in the art will realize, most if not all of these links are simply not known or available to the typical business user of a system. The business user therefore has little ability to influence the archiving-strategy of the system he or she uses.

Figure 2:
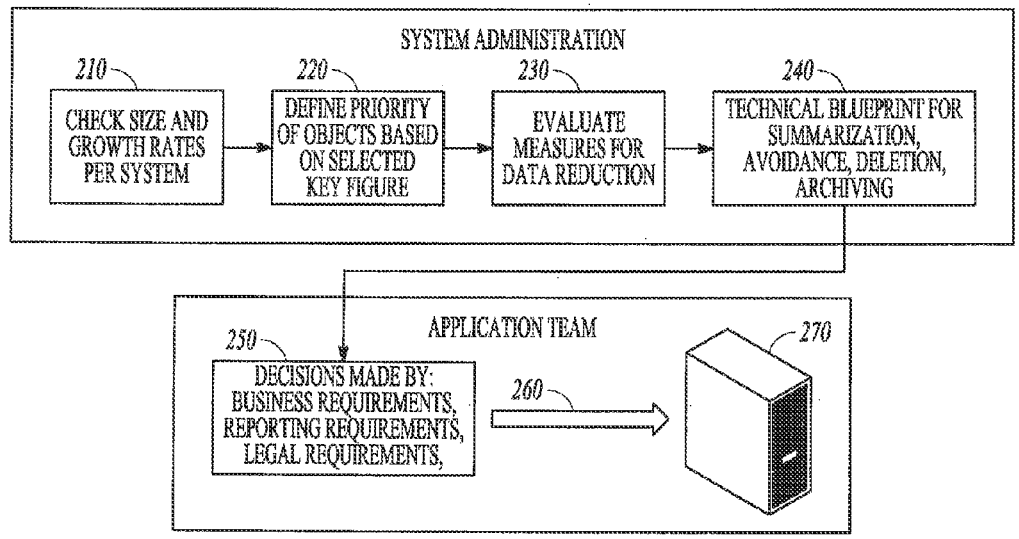
FIG. 2 illustrates a classical method of database table archiving.

FIG. 2 illustrates a classical method of database table archiving. In the classical method, an investigation of archiving needs is done by system administration personnel. At 210, a system admin person checks the size and growth rates of database tables. In complex systems, this is normally done on a system or sub-system level. At 220, the priority of objects is defined. As noted, the definition of the priority of objects by a system admin person is normally based on some technical consideration, such as the size and/or the growth rate of database tables. At 230, different measures are evaluated for data reduction. The measures to be evaluated check to see if data can be deleted if the data is not required anymore, if data can be summarized if too much data is created and contains too much detail in which no one is interested, if data can be avoided by simply changing some settings in the system so that data that is not required is not created at all, or if data is required for the long term but not in the online database (maybe due to legal requirements) so then it to be archived. In a large sense, block 230 reflects manual work of a system administrator to first figure out which options are existing for a selected object, followed by the determination which of the identified options are applicable in a particular environment (for example, there could be some technical options to avoid data, but some business user still needs the data, so this technical option cannot be used due to business reasons). Consequently, block 230 is the prerequisite of getting the results as a technical blueprint in 240. At 240, a technical blueprint for the database tables is generated. The blueprint can be directed to summarization, avoidance, deletion, and/or archiving. Summarization relates to creating summaries of data in the database tables, and summaries or reports of other attributes of the database tables. Avoidance relates to the act of not considering data for archiving, thereby lightening the processing and storage load of the system. Deletion relates to deleting rather than archiving data, and/or deleting archived date that is simply not needed anymore. Of course archiving in one sense is the storing or backing up of data for later retrieval in case of a system crash or other catastrophic event. In another sense, data are archived simply because it is a more economical form of storage and the data may not be needed that often. The application team, in contrast to the system administrator, would like to make archiving decisions at 250 based on business requirements, reporting requirements, and legal requirements. In the classic approach of FIG. 2, the technical blueprint and system administrator normally prevail, and the data archiving is executed at 260 into an archiving database 270.

As noted, classical methods of database archiving are technically driven. That is, they are not driven by business needs. This creates several issues in the archiving of business database tables. A business user does not normally understand the technical aspects of a system. So, when the technical aspects of a system drive the archiving strategy of the system, the wants and needs of the business user get left by the wayside. Even if business users were consulted, getting a "sign-off" from business users on an archiving strategy is hard to get because the business users are not conversant in the "technical language." That is, in current systems, archiving activities can only be driven by systems teams because the technical systems personnel understand the database table level. Consequently, any attempt to move responsibility for archiving activities from systems administration personnel to application teams would in all likelihood not work due to lack of technical knowledge of the application teams. Similarly, systems personnel are not normally familiar with the process flow and database tables related to a business process. Rather, and once again, the systems personnel are familiar with database table size and growth. Additionally, the technical approach is reactive and focuses on objects in a single system that is large in size or that shows high growth rates. These objects do not necessarily involve the business critical processes, nor do they necessarily cover processes running across a landscape (involving different systems).

To address these issues with classical archiving strategies, an embodiment is business-driven. A business driven approach realizes that a typical business user has no interest in archiving. However, the business user of course wants good performance and stability of his or her business processes. So, from a technical viewpoint, to gain performance and to stabilize it, data processing in terms of archiving is the key. Consequently, in an indirect sense at least, the business user has an interest in archiving. Then, these selections of business scenarios and processes are used to determine the related database tables. In such an embodiment, the systems administration team simply supports the application team on the way to the technical and business blueprint. An advantage of this system and method is that it does not require real live data; it works for non-production environments (with no data) and planned business processes. This puts the application team in charge of its own data.

Figure 3:
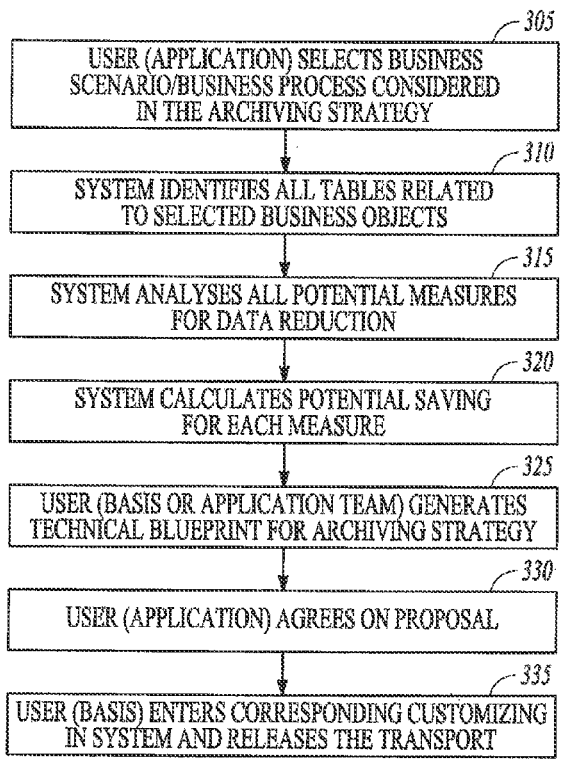
FIG. 3 is a flowchart of an example embodiment of a process for a business-driven archiving strategy.

FIG. 3 is a flowchart of an example embodiment of a process 300 for a business-driven archiving strategy. FIG. 3 includes a number of process blocks 305-335. Though arranged serially in the example of FIG. 3, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 3, at 305, an application user selects a business scenario and/or a business process that is to be considered in an archiving strategy. At 310, the system identifies all database tables that are related to the selected business objects. At 315, the system analyzes all potential measures for data reduction, and at 320, the system calculates potential savings for each measure. Of course if the amount of data that is archived can be reduced, there is some processor and storage savings associated with such data reduction. At 325, a system or application user generates a technical blueprint for an archiving strategy. As noted in connection with FIG. 2, the technical blueprint includes a summarization of the database tables, an avoidance of archiving some data, a deletion of some data rather than archiving the data, and of course archiving the data. At 330, the application user agrees to the archiving proposal, and at 335, the system person enters corresponding customization of the archiving in the system and releases the transport of the data to be archived.

Consequently, in an embodiment, a system and method guide business users from the selection of a business process and/or business scenario (a scenario groups several business processes together) to the related database tables and archiving objects. As a result, a business user with little or no technical knowledge of a system can simply open a change request to the systems administration team or personnel with the details of what kind of data the user would like to archive.

In order to achieve this, the system and method evaluate a business process repository. The business process repository includes content containing all software products with all of the standardized business scenarios and business processes of the software products. Using the repository, either systems personnel or end users can simply document the database tables that are related to the business processes of interest in the repository.

In order to have a proactive approach to archiving, using an embodiment of the system and method, a business user can select a business critical process even if there is not yet any data in the system. This is in stark contrast to current systems, wherein a systems administration team commences archiving activities only for the largest databases and/or objects in the system, and with no consideration of the business processes that are impacted by such an archiving strategy. The system and method evaluate a list of objects related to the selected business process including all related database tables. In an embodiment, a system dictionary includes the information of which database tables are linked to which archiving objects. This information is also extracted at runtime to identify the entire data linkage from the technical layer (database tables and archiving objects) to the application and business process layer (business process repository). The system and method can be used in connection with data archiving, data volume management, reverse process documentation, data analysis, and business process analysis.

Figure 4:
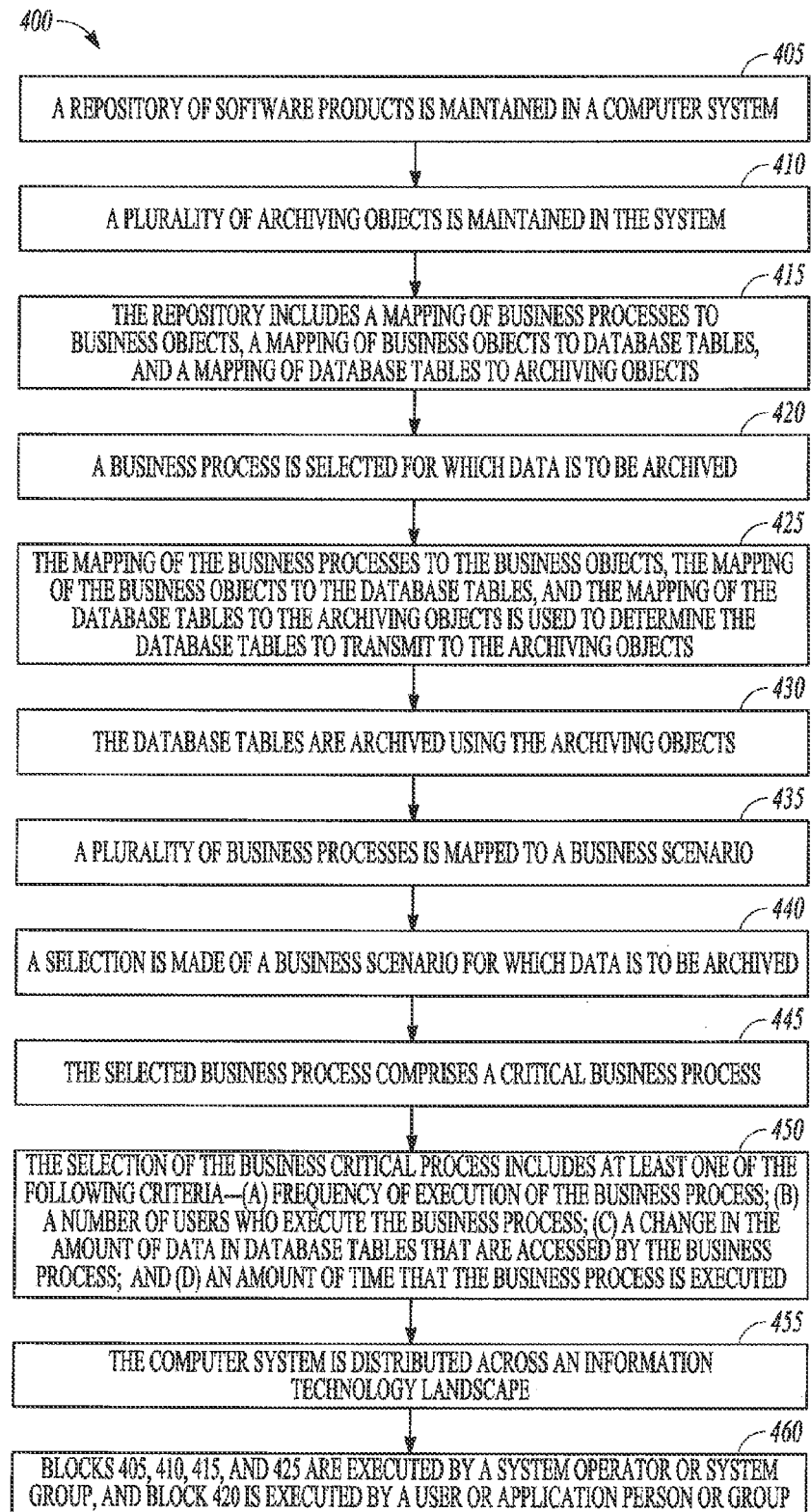
FIG. 4 is a flowchart-like diagram illustrating the features and process steps of an example embodiment of a system and method of business-driven archiving.

FIG. 4 is a flowchart-like diagram illustrating the features and process steps of an example embodiment of a system and method of business-driven archiving. FIG. 4 includes a number of process blocks 405-460. Though arranged serially in the example of FIG. 4, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 4, at 405, a repository of software products is maintained in a computer system. The software products include a plurality of business processes, and each business process includes at least one business object. At 410, a plurality of archiving objects is maintained in the system. At 415, the repository includes a mapping of each business process to at least one business object, a mapping of each business object to at least one related database table, and a mapping of each database table to at least one related archiving object. At 420, a business process is selected for which data is to be archived. At 425, the mapping of the each business process to the at least one business object, the mapping of the each business object to the at least one database table, and the mapping of the each database table to the at least one archiving object is used to determine the database tables to transmit to the archiving objects.

At 430, the database tables are archived using the archiving objects. At 435, a plurality of business processes is mapped to a business scenario, and at 440, a selection is made of a business scenario for which data is to be archived. At 445, the selected business process comprises a critical business process. At 450, the selection of the business critical process includes at least one of the following criteria—(a) frequency of execution of the business process; (b) a number of users who execute the business process; (c) a change in the amount of data in database tables that are accessed by the business process; and (d) an amount of time that the business process is executed. At 455, the computer system is distributed across an information technology landscape. At 460, the aforementioned steps 405, 410, 415, and 425 are executed by a system operator or system group, and step 420 is executed by a user or application person or group.

Another embodiment relates to the process of decision making in data volume management (DVM). In this embodiment, the unique fingerprint of every specific customer landscape of a system is taken as the main input to enable an automated method for decision making. There are a variety of technical key figures or attributes which are of importance for the technical identification of objects that are to be covered in the DVM strategy. The idea is to simply provide a method to an end user that allows the end user to enter a certain 'weighting factor for each of the key figures or attributes, and the system automatically proposes the objects to be covered based on the given input. This simplification enables any kind of end user (system administrator, business stakeholder, landscape owners, or a DVM project leader) to simply define the priority of certain technical aspects of the system based on the specific customer environment or project phase.

For example, some well used technical key figures or attributes are current size and relative growth rate in percent for database tables. For a system that has been operating for several years, or for the very first DVM related project that is just starting, the current size is the main key figure or attribute to identify the objects to be archived. For systems that already have a DVM strategy in place, the top objects in a system cannot be reduced anymore. The objects are large simply because the data is required to be kept online. Consequently, the selection of the top objects would have a low priority and hence a low weighting factor. In the case of the relative growth rate in percent, it would be of a high weighting factor. The system would rank those objects as high, which are maybe not too big in size, but show a high weekly or monthly growth rate in percent (e.g., objects that show a large growth rate in percent will soon end up in the list of top objects). In order to provide key figures or for any kind of project phase or stakeholder in the decision making process, the core key figures would comprise the following—current size in megabytes, monthly/weekly growth rate in megabytes, monthly/weekly growth rate in percentage, table utilization statistics (number of read, write, update, and delete operations per table), age of data within the object (e.g., data older than 2 years), and the degree of archiving complexity.

In the execution of the program, for the decision making process, the end user simply defines the weighting factor for each of the technical key figures provided. The program then automatically evaluates which object is the top ranked one based on the given user input. Internally the program will select for one or multiple systems all data related to the relevant key figure and create a ranking list based on each single key figure. At the end the program applies the relevant weighting factor to each single category to calculate the final value points for each category. All the single value points of each category are added at the end to make the final decision ranking.

Figure 5:
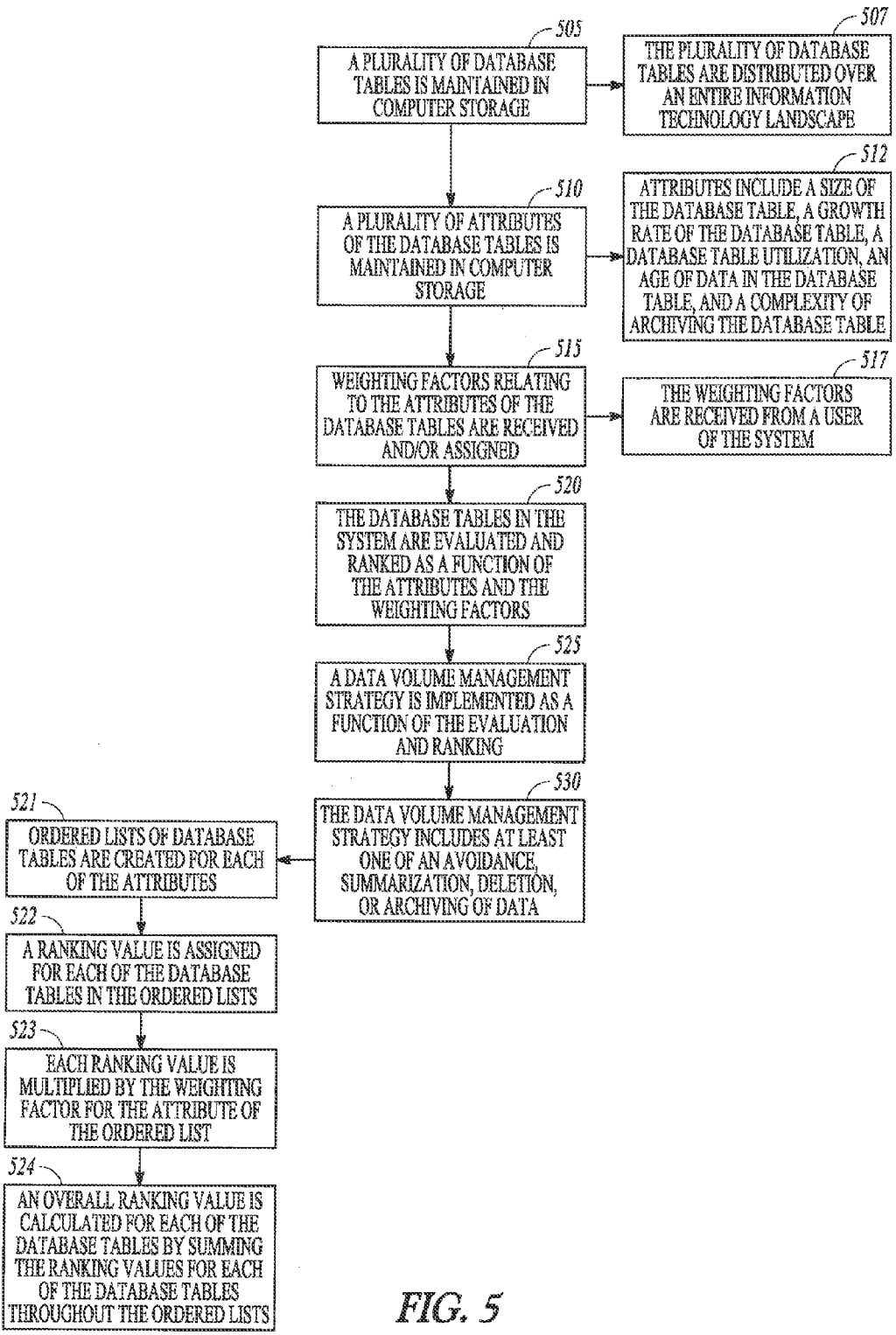
FIG. 5 is a flowchart-like diagram illustrating the features and process steps of an example embodiment of a system and method of using weighting factors for database table attributes in a data volume management system.

FIG. 5 is a flowchart-like diagram illustrating the features and process steps of an example embodiment of a system and method of using weighting factors for database table features in an archiving system. FIG. 5 includes a number of process blocks 505-530. Though arranged serially in the example of FIG. 5, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 5, at 505, a plurality of database tables is maintained in computer storage. In many computer systems, business users of the computer system will not be aware of the structure of identity of the database tables. As noted at 507, the plurality of database tables can be distributed over an entire information technology landscape. At 510, a plurality of attributes of the database tables is maintained in computer storage. As noted in block 512, these attributes can include such things as a size of the database table, a growth rate of the database table, a database table utilization, an age of data in the database table, a complexity of archiving the database table, and the importance of the data (via reference to business critical processes). At 515, weighting factors relating to the attributes of the database tables are received and/or assigned. As noted in block 517, the weighting factors can be received from a user of the system, and in particular, a business user of the system. At 520, the database tables in the system are evaluated and ranked as a function of the attributes and the weighting factors. The details of this evaluation and ranking are explained below. At 525, a data volume management strategy is implemented as a function of the evaluation and ranking. At 530, the data volume management strategy includes at least one of an avoidance, summarization, deletion, or archiving of data.

The details of the evaluation and ranking of the database tables are as follows. At 521, ordered lists of database tables are created for each of the attributes. At 522, a ranking value is assigned for each of the database tables in the ordered lists. For example, in there are N number of database tables in the system, then for each attribute, the tables are ordered and numerically ranked from 1 to N. For example, for the database table size, the smallest database table could be given a rank of 1, and the largest database table could be given a rank of N. At 523, each ranking value is multiplied by the weighting factor for the attribute of the ordered list. For example, if a user decided that the attribute of current size should have a weighting factor of 0.5, and the other five attributes should each have a weighting factor of 0.1, then each ranking value in the database size ordered list would be multiplied by 0.5, and each ranking value in the other ordered lists would be multiplied by 0.1. At 524, an overall ranking value is calculated for each of the database tables by summing the ranking values for each of the database tables throughout the ordered lists. This provides an overall ranking for each database table, and the system can be programmed to execute different DVM strategies based on the overall ranking value. A user may provide different weighting factors to the different attributes depending on which DVM strategy the user is interested in examining. For example, if a user is interested in having the tool identify database tables for archiving, the attribute of table utilization statistics may be given a large weighting factor. If the user is interested in an avoidance DVM strategy, a low weighting factor for table utilization statistics might be more appropriate.

Figure 6:
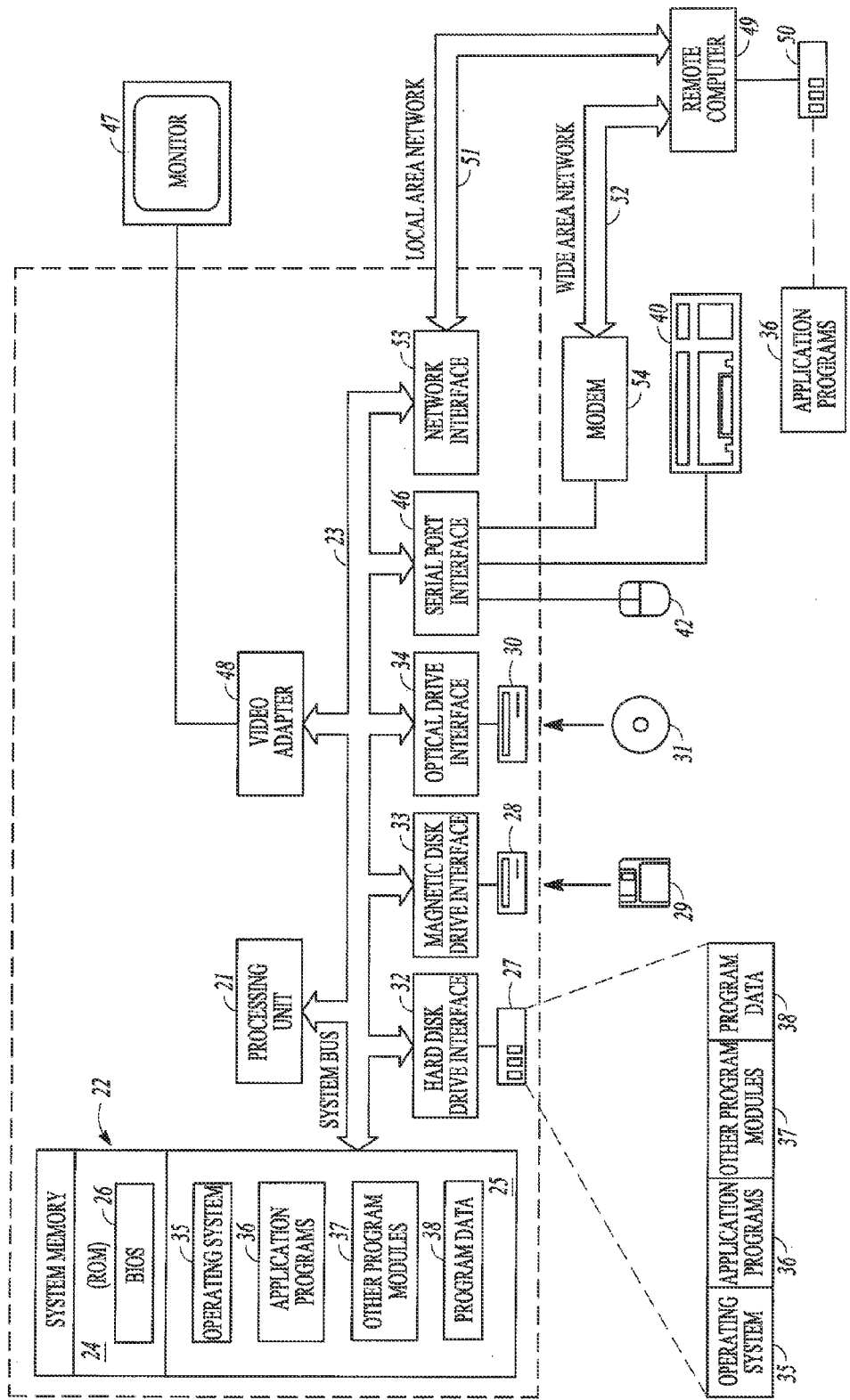
FIG. 6 is a block diagram of an example embodiment of a computer system upon which one or more of the embodiments disclosed herein can execute.

FIG. 6 is an overview diagram of hardware and an operating environment in conjunction with which embodiments of the invention may be practiced. The description of FIG. 5 is intended to provide a brief, general description of suitable computer hardware and a suitable computing environment in conjunction with Which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 6 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
    a system administrative subsystem;
    an application subsystem; and
    a computer processor and a computer storage device configured to:
    (a) at the system administrative subsystem, maintain in the computer storage device a repository of software products in the system, the software products comprising a plurality of business processes, each business process comprising at least one business object;
    (b) at the system administrative subsystem, maintain in the computer storage device a plurality of archiving objects;
    (c) at the system administrative subsystem, maintain in the repository a mapping of each business process to at least one business object, a mapping of each business object to at least one related database table, and a mapping of each database table to at least one related archiving object;
    (d) at the application subsystem, receive into the computer processor a selection of a business process for which data is to be archived; and
    (e) at the system administrative subsystem, use the mapping of the each business process to the at least one business object, the mapping of the each business object to the at least one database table, the mapping of the each database table to the at least one archiving object, and the selection of the business process at the application subsystem to determine the database tables to transmit to the archiving objects;
    wherein the selected business process comprises a critical business process; and
    wherein the critical business process is selected using the following criteria:
    (a) a frequency of execution of the business process;
    (b) a number of users who execute the business process;
    (c) a change in the amount of data in database tables that are accessed by the business process; and
    (d) an amount of time that the business process is executed.

2. The system of claim 1, wherein the archiving objects are configured to archive the database tables.

3. The system of claim 1, wherein a plurality of business processes are mapped to a business scenario, and the computer processor is configured to receive a selection of a business scenario for which data is to be archived.

4. The system of claim 1, comprising a plurality of computer processors and a plurality of computer storage devices distributed across an information technology landscape.

5. A process comprising:
    (a) at a system administrative subsystem, maintaining in a computer storage device a repository of software products in the system, the software products comprising a plurality of business processes, each business process comprising at least one business object;
    (b) at the system administrative subsystem, maintaining in the computer storage device a plurality of archiving objects;
    (c) at the system administrative subsystem, maintaining in the repository a mapping of each business process to at least one business object, a mapping of each business object to at least one related database table, and a mapping of each database table to at least one related archiving object;
    (d) at an application subsystem, receiving into the computer processor a selection of a business process for which data is to be archived; and
    (e) at the system administrative subsystem, using the mapping of the each business process to the at least one business object, the mapping of the each business object to the at least one database table, the mapping of the each database table to the at least one archiving object, and the selection of the business process at the application subsystem to determine the database tables to transmit to the archiving objects;
    wherein the selected business process comprises a critical business process; and
    wherein the critical business process is selected using the following criteria:
    (a) a frequency of execution of the business process;
    (b) a number of users who execute the business process;
    (c) a change in the amount of data in database tables that are accessed by the business process; and
    (d) an amount of time that the business process is executed.

6. The process of claim 5, comprising archiving the database tables using the archiving objects.

7. The process of claim 5, comprising mapping a plurality of business processes to a business scenario, and receiving a selection of a business scenario for which data is to be archived.

8. The process of claim 5, wherein the computer storage device is distributed across an information technology landscape.

9. A computer readable storage device comprising instructions that when executed by a processor execute a process comprising:
(a) at a system administrative subsystem, maintaining in a computer storage device a repository of software products in the system, the software products comprising a plurality of business processes, each business process comprising at least one business object;
(b) at the system administrative subsystem, maintaining in the computer storage device a plurality of archiving objects;
(c) at the system administrative subsystem, maintaining in the repository a mapping of each business process to at least one business object, a mapping of each business object to at least one related database table, and a mapping of each database table to at least one related archiving object;
(d) at an application subsystem, receiving into the computer processor a selection of a business process for which data is to be archived; and
(e) at the system administrative subsystem, using the mapping of the each business process to the at least one business object, the mapping of the each business object to the at least one database table, the mapping of the each database table to the at least one archiving object, and the selection of the business process at the application subsystem to determine the database tables to transmit to the archiving objects;
wherein the selected business process comprises a critical business process; and
wherein the critical business process is selected using the following criteria:
(a) a frequency of execution of the business process;
(b) a number of users who execute the business process;
(c) a change in the amount of data in database tables that are accessed by the business process; and
(d) an amount of time that the business process is executed.

10. The computer readable storage device of claim 9, comprising instructions for archiving the database tables using the archiving objects.

11. The computer readable storage device of claim 9, comprising instructions for mapping a plurality of business processes to a business scenario, and receiving a selection of a business scenario for which data is to be archived.

12. The computer readable storage device of claim 9, wherein the computer storage device is distributed across an information technology landscape.

\* \* \* \* \*